(12) United States Patent
Wu et al.

(10) Patent No.: US 11,089,468 B2
(45) Date of Patent: Aug. 10, 2021

(54) LOCATION AREA MANAGEMENT METHOD, CONTROL PLANE NODE, AND USER EQUIPMENT

(71) Applicant: HUAWEI TECHNOLOGIES CO., LTD., Shenzhen (CN)

(72) Inventors: Yizhuang Wu, Beijing (CN); Chunshan Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 16/583,462

(22) Filed: Sep. 26, 2019

(65) Prior Publication Data

US 2020/0021971 A1  Jan. 16, 2020

Related U.S. Application Data

(63) Continuation of application No. PCT/CN2017/079596, filed on Apr. 6, 2017.

(51) Int. Cl.
*H04W 8/08* (2009.01)
*H04W 60/00* (2009.01)
(Continued)

(52) U.S. Cl.
CPC .......... *H04W 8/08* (2013.01); *H04W 60/00* (2013.01); *H04W 64/006* (2013.01); *H04W 68/005* (2013.01)

(58) Field of Classification Search
CPC combination set(s) only.
See application file for complete search history.

(56) References Cited

U.S. PATENT DOCUMENTS

| 2011/0069664 | A1* | 3/2011 | Yin | H04W 60/00 370/328 |
| 2013/0095862 | A1* | 4/2013 | Bejerano | H04W 68/02 455/458 |
| 2016/0100362 | A1* | 4/2016 | Palanisamy | H04W 52/0229 370/311 |

FOREIGN PATENT DOCUMENTS

| CN | 101068370 A | 11/2007 |
| CN | 102045834 A | 5/2011 |

(Continued)

OTHER PUBLICATIONS

Huawei, Evaluation of solution 6.3.27 for multiple level tracking area handling, SA WG2 Meeting S2#117, 3GPP, Nov. 2016, Reno, Nevada, USA. (Year: 2016).*

(Continued)

*Primary Examiner* — Said M Elnoubi
(74) *Attorney, Agent, or Firm* — Maier & Maier, PLLC

(57) ABSTRACT

Embodiments provide a location area management method, a control node, and user equipment (UE). The method is applied to a communications system including a control plane node, and the control plane node stores an upper-level area identity list of UE. The control plane node determines a lower-level area identity list of the UE based on the upper-level area identity list. The control plane node sends the lower-level area identity list to the UE. When the upper-level area identity list is allocated to the UE, the lower-level area identity list is allocated to the UE. The lower-level area identity list includes fewer areas than the upper-level area identity list, so that when the control plane node pages the UE, paging is performed in an area corresponding to the lower-level area identity list, thereby reducing signaling overheads of a network side device.

17 Claims, 10 Drawing Sheets

(51) Int. Cl.
*H04W 64/00* (2009.01)
*H04W 68/00* (2009.01)

(56) References Cited

FOREIGN PATENT DOCUMENTS

| | | |
|---|---|---|
| CN | 102149107 A | 8/2011 |
| CN | 104754632 A | 7/2015 |
| CN | 105900503 B | 5/2020 |
| KR | 20160088511 A | 7/2016 |

OTHER PUBLICATIONS

Huawei et al., "Evaluation of solution 6.3.27 for multiple level tracking area handling", SA WG2 Meeting S2#117, S2-166436, Nov. 14-18, 2016, total 6 pages, Reno, Nevada, USA, XP051184996.
3GPP TR 23.799 V14.0.0, "3rd Generation Partnership Project; Technical Specification Group Services and System Aspects; Study on Architecture for Next Generation System (Release 14)", Dec. 2016, total 522 pages.
Huawei, et al., Multiple level Tracking Area management and update the Interim agreements on mobility management, SA WG2 Meeting #117, S2-166278, Oct. 17-21, 2016, total 6 pages, Kaohsiung, Taiwan, XP051172327.

\* cited by examiner

| A1 | A2 | A3 | A4 | A5 | A6 | A7 | A8 | A9 |
|----|----|----|----|----|----|----|----|----|
| B1 | B2 | B3 | B4 | B5 | B6 | B7 | B8 | B9 |
| C1 | C2 | C3 | C4 | C5 | C6 | C7 | C8 | C9 |
| D1 | D2 | D3 | D4 | D5 | D6 | D7 | D8 | D9 |
| E1 | E2 | E3 | E4 | E5 | E6 | E7 | E8 | E9 |
| F1 | F2 | F3 | F4 | F5 | F6 | F7 | F8 | F9 |
| G1 | G2 | G3 | G4 | G5 | G6 | G7 | G8 | G9 |
| H1 | H2 | H3 | H4 | H5 | H6 | H7 | H8 | H9 |
| I1 | I2 | I3 | I4 | I5 | I6 | I7 | I8 | I9 |

LOCATION AREA MANAGEMENT METHOD, CONTROL PLANE NODE, AND USER EQUIPMENT

CROSS-REFERENCE TO RELATED APPLICATIONS

This application is a continuation of International Application No. PCT/CN2017/079596, filed on Apr. 6, 2017, the disclosure of which is hereby incorporated by reference in its entirety.

FIELD

Embodiments relate to the field of communications technologies, and in particular, to a location area management method, a control plane node, and user equipment.

BACKGROUND

A tracking area identity (TAI) list concept is introduced in long term evolution (LTE) technology. One TAI list may include 1 to 16 TAIs. The TAI is used to identify a tracking area. One tracking area may include one or more cells, and one cell belongs to one TA.

A network side device manages user equipment (UE) based on the TAI list. When the UE moves within a tracking area range in an allocated TAI list, the TAI list of the UE does not need to be updated. When the UE moves out of all tracking area ranges in the allocated TAI list, the TAI list of the UE needs to be updated. When the TAI list is updated, the network side device reallocates a group of tracking areas to the UE to constitute a new TAI list.

When the UE is in an idle state, if the network side device initiates a data service to the UE, the network side device pages the UE. To do this, the network side device sends a paging message to the UE within all tracking area ranges in the TAI list of the UE. However, when an area corresponding to the allocated TAI list is excessively large, the overhead of paging the UE by the network side device are large; when an area corresponding to the TAI list is excessively small, although signaling overheads of paging are reduced, the frequency of updating the TAI list increases. Therefore, the issue of how to allocate an appropriate TAI list to the UE becomes a key problem in communications technologies.

SUMMARY

Embodiments provide a location area management method, a control plane node, and user equipment (UE), so as to dynamically allocate different levels of area identity lists to the UE based on a current status of the UE.

According to a first aspect, an embodiment provides a location area management method. The method is applied to a communications system, the communications system includes a control plane node, and the control plane node stores an upper-level area identity list of UE. The method includes: determining, by the control plane node, a lower-level area identity list of the UE based on the upper-level area identity list; and sending, by the control plane node, the lower-level area identity list to the UE. The lower-level area identity list is dynamically allocated to the UE based on the upper-level area identity list, so that a more appropriate TAI list can be allocated to the UE, thereby reducing signaling overheads of a network side device.

In a possible embodiment, an area corresponding to the lower-level area identity list is included in an area corresponding to the upper-level area identity list.

In a possible embodiment, the method further includes: when the UE enters an idle state from a connected state, starting, by the control plane node, N reachability management timers, where N is equal to a quantity of levels of an area identity list of the UE stored on the control plane node; and determining, by the control plane node, a paging range of the UE or a reachability status of the UE based on statuses of the N reachability management timers. In the idle state, a number of timers are started, and a paging area is determined based on statuses of the timers when the UE needs to be paged, thereby reducing signaling overheads of paging a user. N is equal to a quantity of levels of an area identity list of the UE stored on the control plane node.

In a possible embodiment, the method further includes: instructing, by the control plane node, of the UE to store the lower-level area identity list; or indicating, by the control plane node, a level of the lower-level area identity list to the UE. The area identity list carries indication information, so as to indicate, to a user, that the area identity list is a high-level location area, and instruct the user to store the area identity list.

In a possible embodiment, the instructing, by the control plane node, of the UE to store the lower-level area identity list includes: sending, by the control plane node, indication information to the UE, where the indication information is used to instruct the UE to store the lower-level area identity list, and the indication information is further used to instruct the UE to retain the stored area identity list. The indication information instructs the UE to store received first-level to $N^{th}$-level area identity lists.

In a possible embodiment, the indicating, by the control plane node, of a level of the lower-level area identity list to the UE includes: sending, by the control plane node, indication information to the UE, where the indication information is used to indicate the level of the lower-level area identity list. In this way, the UE stores the area identity list based on the level of the lower-level area identity list.

In a possible embodiment, the control plane node is a mobility management entity (MME) or an access and mobility management function (AMF) entity or any functional entity configured to manage a location of the UE.

In a possible embodiment, the determining, by the control plane node, of a lower-level area identity list of the UE based on the upper-level area identity list includes: determining, by the control plane node, the lower-level area identity list of the UE based on the upper-level area identity list and at least one of a historical moving track of the UE, a moving mode of the UE, a predicted moving track of the UE, and a current location of the UE. The lower-level area identity list is determined based on a number of types of information, so that an area included in the lower-level area identity list is more appropriate.

In a possible embodiment, when the UE initiates initial registration or the UE is located in an area outside a registered location area, the control plane node determines an initial-level area identity list of the UE. The control plane node sends the initial-level area identity list to the UE. The area corresponding to the upper-level area identity list is included in an area corresponding to the initial-level area identity list, or the upper-level area identity list is the initial-level area identity list. In different cases, different area identity lists are dynamically reallocated to the UE, so that paging management of the UE is more flexible and accurate.

In a possible embodiment, the control plane node further storing a periodic location update time value of the upper-level area identity list includes: sending, by the control plane node, a periodic location update time value of the lower-level area identity list to the UE. The periodic location update time value of the lower-level area identity list is greater than the periodic location update time value of the upper-level area identity list. Different periodic location update time values are configured for different levels of area identity lists, so that a network more accurately determines a location of the UE, thereby reducing signaling overheads during paging.

According to a second aspect, an embodiment provides a location area management method. The method is applied to a communications system, the communications system includes UE, and the UE stores an upper-level area identity list. The method includes: receiving, by the UE, a lower-level area identity list sent by a control plane node; and storing, by the UE, the lower-level area identity list. The lower-level area identity list is dynamically allocated to the UE based on the upper-level area identity list, so that a more appropriate TAI list can be allocated to the UE, thereby reducing signaling overheads of a network side device.

In a possible embodiment, an area corresponding to the lower-level area identity list is included in an area corresponding to the upper-level area identity list. In different cases, different area identity lists are dynamically reallocated to the UE, so that paging management is more flexible and accurate.

In a possible embodiment, when the UE enters an idle state from a connected state, the UE starts N periodic timers. The UE determines, based on statuses of the N timers and a location of the UE, to send a location area management request to the control plane node, where the location area management request is used to notify the control plane node that the UE is in a reachable state. In an idle state, the timers are started, and a paging management procedure is executed based on statuses of the timers, thereby reducing signaling overheads of the paging management. In an embodiment, N is equal to a quantity of levels of an area identity list stored on the UE.

In a possible embodiment, the UE stores the lower-level area identity list according to an instruction of the control plane node. Alternatively, the UE determines a level of the lower-level area identity list according to an instruction of the control plane node. The area identity list carries indication information, so as to instruct the UE to store the area identity list.

In a possible embodiment, the storing, by the UE, of the lower-level area identity list according to an instruction of the control plane node includes: receiving, by the UE, indication information sent by the control plane node. The indication information is used to instruct the UE to store the lower-level area identity list, and the indication information is further used to instruct the UE to retain the stored area identity list. The indication information instructs the UE to store a received area identity list.

In a possible embodiment, the determining, by the UE, of a level of the lower-level area identity list according to an instruction of the control plane node includes: receiving, by the UE, indication information sent by the control plane node, where the indication information is used to indicate the level of the lower-level area identity list; and storing, by the UE, the level of the lower-level area identity list based on the level of the lower-level area identity list. Further, the indication information is further used to instruct the UE to retain the stored area identity list.

In a possible embodiment, the control plane node is an MME or an AMF or any functional entity configured to manage a location of the UE.

In a possible embodiment, the UE receives an initial-level area identity list sent by the control plane node. The UE stores the initial-level area identity list. The area corresponding to the upper-level area identity list is included in an area corresponding to the initial-level area identity list, or the upper-level area identity list is the initial-level area identity list.

In a possible embodiment, that the UE further stores a periodic location update time value of the upper-level area identity list includes: receiving, by the UE, a periodic location update time value of the lower-level area identity list. The periodic location update time value of the lower-level area identity list is greater than the periodic location update time value of the upper-level area identity list. Different periodic location update time values are configured for different area identity lists, thereby reducing signaling overheads generated by location area update.

According to a third aspect, an embodiment provides a control plane node. The control plane node stores an upper-level area identity list of UE. The control plane node includes a processing unit and a sending unit. The processing unit is configured to determine a lower-level area identity list of the UE based on the upper-level area identity list. The sending unit is configured to send the lower-level area identity list to the UE. The lower-level area identity list is dynamically allocated to the UE based on the upper-level area identity list, so that a more appropriate TAI list can be allocated to the UE, thereby reducing signaling overheads of a network side device.

In a possible embodiment, an area corresponding to the lower-level area identity list is included in an area corresponding to the upper-level area identity list. In different cases, different area identity lists are dynamically reallocated to the UE, so that paging management is more flexible and accurate.

In a possible embodiment, when the UE enters an idle state from a connected state, the processing unit is configured to start N reachability management timers. N is equal to a quantity of levels of an area identity list of the UE stored on the control plane node. The processing unit is further configured to determine a paging range of the UE or a reachability status of the UE based on statuses of the N reachability management timers. In the idle state, the timers are started, and a paging area is determined based on the statuses of the timers when the UE needs to be paged, thereby reducing signaling overheads of paging a user.

In a possible embodiment, the processing unit is further configured to: instruct the UE to store the lower-level area identity list; or indicate a level of the lower-level area identity list to the UE. The area identity list carries indication information, so as to instruct the UE to store the area identity list.

In a possible embodiment, the instructing of the UE to store the lower-level area identity list includes: sending indication information to the UE, where the indication information is used to instruct the UE to store the lower-level area identity list, and the indication information is further used to instruct the UE to retain the stored area identity list. The indication information instructs the UE to store a received lower-level area identity list, and is further used to instruct to retain the stored area identity list.

In a possible embodiment, the indicating of a level of the lower-level area identity list to the UE includes: sending indication information to the UE, where the indication information is used to indicate the level of the lower-level area identity list. In this way, the UE stores the area identity list based on a level of the area identity list.

In a possible embodiment, the control plane node is an MME or an AMF or any functional entity configured to manage a location of the UE.

In a possible embodiment, the determining of a lower-level area identity list of the UE based on the upper-level area identity list includes: determining the lower-level area identity list of the UE based on the upper-level area identity list and at least one of a historical moving track of the UE, a moving mode of the UE, a predicted moving track of the UE, and a current location of the UE. The lower-level area identity list is determined based on a number of types of information, so that an area included in the lower-level area identity list is more appropriate.

In a possible embodiment, the processing unit is configured to: when the UE initiates initial registration or the UE is located in an area outside a registered location area, determine an initial-level area identity list of the UE; and the sending unit is configured to send the initial-level area identity list to the UE. The area corresponding to the upper-level area identity list is included in an area corresponding to the initial-level area identity list, or the upper-level area identity list is the initial-level area identity list.

In a possible embodiment, the control plane node further stores a periodic location update time value of the upper-level area identity list. The sending unit is further configured to send a periodic location update time value of the lower-level area identity list to the UE. The periodic location update time value of the lower-level area identity list is greater than the periodic location update time value of the upper-level area identity list.

According to a fourth aspect, an embodiment provides UE. The UE stores an upper-level area identity list. The UE includes a receiving unit and a processing unit. The receiving unit is configured to receive a lower-level area identity list sent by a control plane node. The processing unit is configured to store the lower-level area identity list. The lower-level area identity list is allocated to the UE, thereby reducing signaling overheads of a system. The lower-level area identity list is dynamically allocated to the UE based on the upper-level area identity list, so that a more appropriate TAI list can be allocated to the UE, thereby reducing signaling overheads of a network side device.

In a possible embodiment, an area corresponding to the lower-level area identity list is included in an area corresponding to the upper-level area identity list.

In a possible embodiment, the processing unit is configured to: when the UE enters an idle state from a connected state, start N periodic timers, where N is equal to a quantity of levels of an area identity list stored on the UE. A sending unit is configured to determine, based on statuses of the N periodic timers and a location of the UE, to send a location area management request to the control plane node, where the location area management request is used to notify the control plane node that the UE is in a reachable state. In an idle state, the periodic timers are started, and a paging procedure is executed based on the statuses of the periodic timers, thereby reducing signaling of paging management.

In a possible embodiment, the processing unit is configured to: store the lower-level area identity list according to an instruction of the control plane node; or determine a level of the lower-level area identity list according to an instruction of the control plane node. The area identity list carries indication information, so as to instruct the UE to store the area identity list.

In a possible embodiment, the storing of the lower-level area identity list according to an instruction of the control plane node includes: receiving indication information sent by the control plane node, where the indication information is used to instruct the UE to store the lower-level area identity list, the indication information is further used to instruct the UE to store the lower-level area identity list, and the indication information is further used to instruct the UE to retain the stored area identity list; and storing the lower-level area identity list based on the indication information.

In a possible embodiment, the determining of a level of the lower-level area identity list according to an instruction of the control plane node includes: receiving indication information sent by the control plane node, where the indication information is used to indicate the level of the lower-level area identity list to the UE; and storing the level of the lower-level area identity list based on the indication information. The indication information indicates a level of a currently received area identity list to the UE. In this way, the UE stores the area identity list based on the level of the area identity list.

In a possible embodiment, the control plane node is an MME or an AMF or any functional entity configured to manage a location of the UE.

In a possible embodiment, the receiving unit is configured to receive an initial-level area identity list sent by the control plane node. The processing unit is configured to store the initial-level area identity list. The area corresponding to the upper-level area identity list is included in an area corresponding to the initial-level area identity list, or the upper-level area identity list is the initial-level area identity list. In a number of cases, the area identity list is reallocated to the UE, so that the area identity list is more convenient.

In a possible embodiment, the UE further stores a periodic location update time value of the upper-level area identity list. The receiving unit is further configured to receive a periodic location update time value of the lower-level area identity list. The periodic location update time value of the lower-level area identity list is greater than the periodic location update time value of the upper-level area identity list. Different periodic location update time values are configured for different levels of area identity lists, thereby reducing signaling overheads generated by update of the area identity list.

According to a fifth aspect, an embodiment provides a control plane node. The control plane node includes a processor, a memory, a communications interface, and a system bus. The memory and the communications interface are connected to the processor and implement mutual communication by using the system bus. The memory is configured to store a computer executable instruction. The communications interface is configured to communicate with another device. The processor is configured to run the computer executable instruction, so that the control plane node performs the method according to any one possible embodiment of the first aspect.

According to a sixth aspect, an embodiment provides UE. The UE includes a processor, a memory, a communications interface, and a system bus. The memory and the communications interface are connected to the processor and implement mutual communication by using the system bus. The memory is configured to store a computer executable instruction. The communications interface is configured to communicate with another device. The processor is configured to run the computer executable instruction, so that the UE performs the method according to any one possible embodiment of the second aspect.

According to a seventh aspect, an embodiment provides a computer readable storage medium that includes an instruction. When the instruction runs on a computer, the computer performs the method according to any one possible embodiment of the first aspect.

According to an eighth aspect, an embodiment provides a computer readable storage medium that includes an instruction. When the instruction runs on a computer, the computer performs the method according to any one possible embodiment of the second aspect.

Embodiments described provide a location area management method, a control plane node, and UE. When the upper-level area identity list is allocated to the UE, the lower-level area identity list is allocated to the UE. The lower-level area identity list includes fewer areas than the upper-level area identity list, so that when the control plane node pages the UE, paging is performed in an area corresponding to the lower-level area identity list, thereby reducing signaling overheads of a network side device.

DESCRIPTION OF EMBODIMENTS

To make the objectives, technical solutions, and advantages of the embodiments clearer, the following describes the technical solutions of the embodiments with reference to the accompanying drawings in the embodiments.

Figure 1:
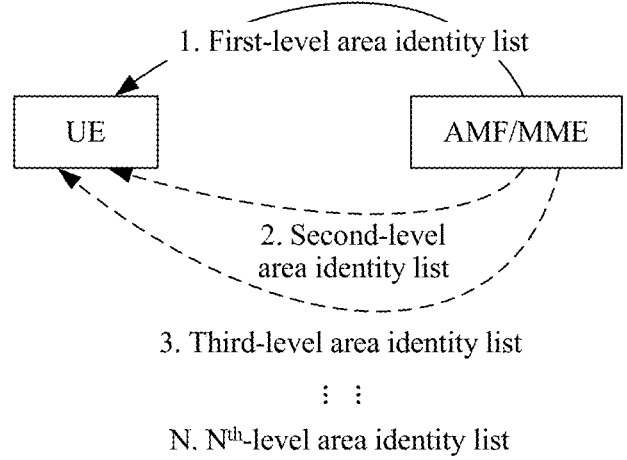
FIG. 1 is a schematic diagram of a paging management method according to an embodiment.

Embodiments provide a location area management method, a control plane node, and UE. The method is used in the control plane node and the UE, so that the control plane node allocates, to the UE, an area identity list that is more suitable for a moving status of the UE. The control plane node pages the UE by using the area identity list allocated to the UE. FIG. 1 is a schematic diagram of a paging management method according to an embodiment.

As shown in FIG. 1, when UE is connected to a control plane node, the control plane node allocates a first-level area identity list to the UE. After determining that the UE includes the first-level area identity list, the control plane node may further allocate a second-level area identity list to the UE according to a specific rule and policy, until an $N^{th}$-level area identity list is allocated to the UE. N may be any positive integer. An area corresponding to the first-level area identity list allocated to the UE is the largest, an area corresponding to the second-level area identity list is smaller than the area corresponding to the first-level area identity list, and the area corresponding to the first-level area identity list includes the area corresponding to the second-level area identity list. An area included in the $N^{th}$-level area identity list is the smallest, and the area corresponding to the $N^{th}$-level area identity list is included in areas corresponding to the first-level to $(N-1)^{th}$-level area identity lists. The control plane node allocates a high-level area identity list based on a requirement, so that a method for flexibly establishing multi-level location area management is provided.

It should be noted that the foregoing description of using the first-level area identity list to the $N^{th}$-level area identity list is only an exemplary implementation in the embodiments, and cannot be used to limit the present application. An area identity list that is corresponding to a smaller area and that is subsequently allocated according to a network rule falls within the protection scope of the exemplary embodiments here, provided that an area identity list corresponding to a larger area is allocated when UE accesses a network.

The location management method described in this specification may be applied to various wireless communications systems that include a number of types of terminals. For example, the wireless communications systems include a global system for mobile communications (GSM), a code division multiple access (CDMA) system, a time division multiple access (TDMA) system, wideband code division multiple access (WCDMA) system, a frequency division multiple access (FDMA) system, an orthogonal frequency division multiple access (OFDMA) system, a single carrier FDMA (SC-FDMA) system, a general packet radio service (GPRS) system, a long term evolution (LTE) system, an E-UTRA system, a 5G mobile communications system, an evolved packet core (EPS), and other similar communications systems.

The UE used in this embodiment may communicate with one or more core networks by using a radio access network (RAN) The UE may be a mobile terminal, for example, a mobile phone (or also referred to as a cellular phone or smart phone), and a computer that has a mobile terminal. For example, the UE may be a portable, pocket-size, handheld, computer built-in or in-vehicle mobile apparatus, which exchanges voice and/or data with the radio access network. For example, the UE may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal a user agent, a user device, or UE, PUE, VUE, or the like.

The control plane node used in this application is an MME in an EPS network, and is a control plane (CP), an AMF, or the like in a 5G network. This is not limited in this application. In an embodiment, only the AMF is used as an example for description, and tasks performed by the AMF included in the solution may also be completed by the MME.

Figure 2:
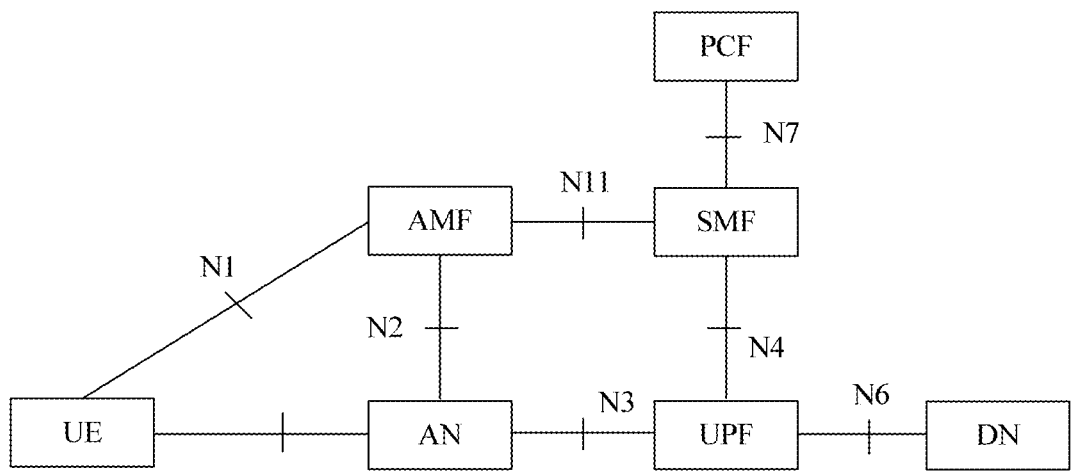
FIG. 2 is a schematic diagram of a 5G network architecture according to an embodiment.
Figure 3:
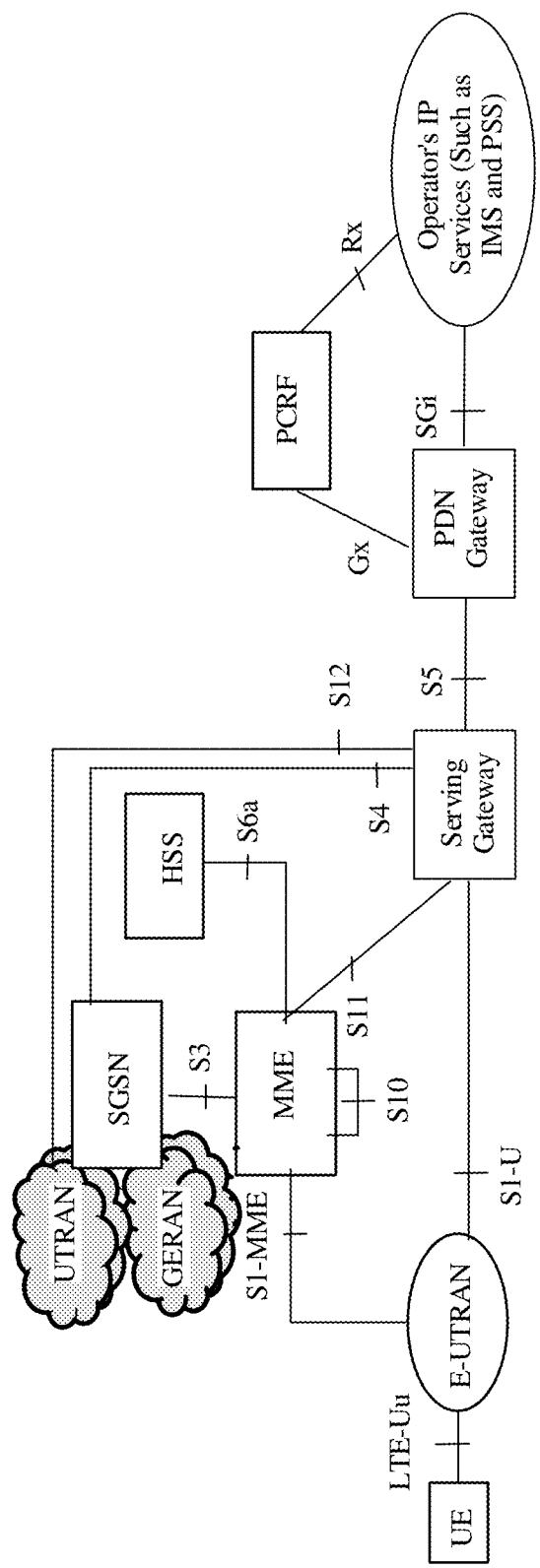
FIG. 3 is a schematic diagram of an EPS network architecture according to an embodiment.

FIG. 2 is a schematic diagram of a 5G network architecture according to an embodiment. FIG. 3 is a schematic diagram of an EPS network architecture according to an embodiment. Referring to FIG. 2, network elements in the system architecture include UE, an access network (AN), an SMF (session management function), UE, a UPF (user plane function), a PCF (policy control function), and a DN (data network). Referring to FIG. 3, network elements in the system architecture include UE, an MME, a UTRAN, a serving GPRS support node (SGSN), a home subscriber server (HSS), a service gateway (SGW), a PDN gateway (PGW), a policy and charging rules function (PCRF) server, an IP server, and the like.

It should be noted that the AMF, the CP, the SMF, the PCF, and the UPF used in the foregoing 5G network architecture may all exist in an entity form, for example, an AMF entity and an SMF entity. An entity may exist independently on a physical device, or coexist with another entity on a same physical device. This is not limited. A function of the AN may be implemented by using an AN node, and the AN node may be a base station or an access point (AP).

Figures 4, 5:
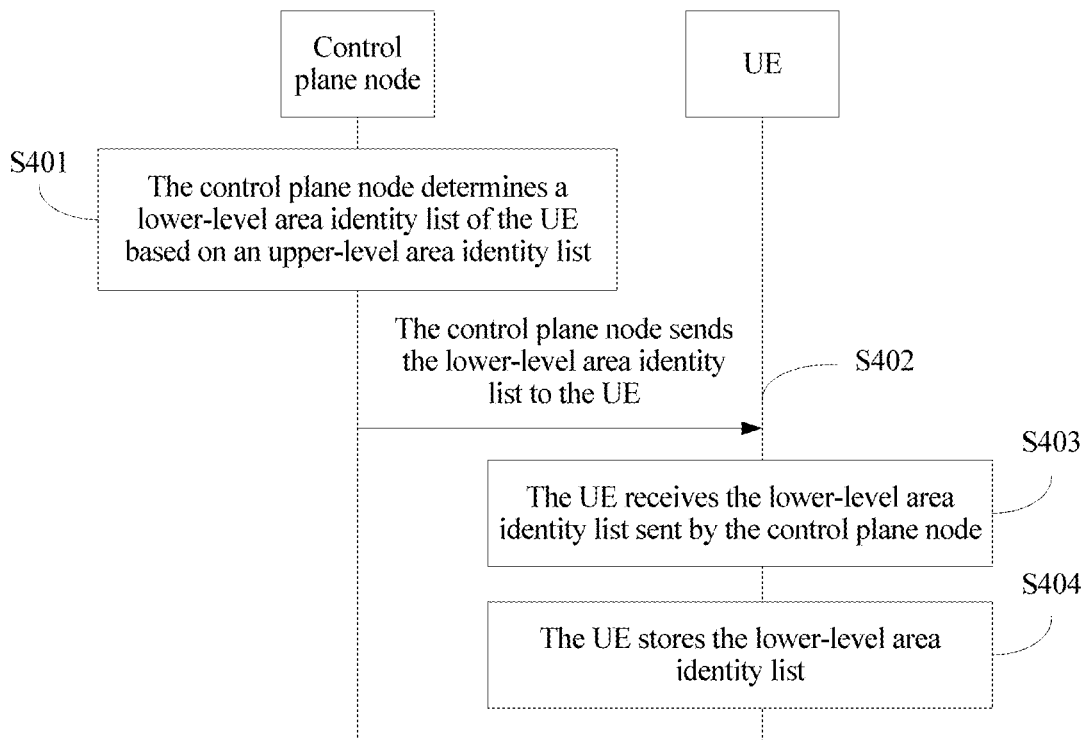
FIG. 4 shows a location area management method according to an embodiment.
FIG. 5 shows an area managed by a control plane node according to an embodiment.

The following describes, in more detail by using FIG. 4, the location area management method described in FIG. 1 in an embodiment. The method may also be applied to the systems shown in FIG. 2 and FIG. 3.

FIG. 4 shows a location area management method according to an embodiment. As shown in FIG. 4, the method is applied to a communications system, the communications system includes a control plane node, and the control plane node stores an upper-level area identity list of UE.

Each step in FIG. 4 is described in detail below.

In step S401, the control plane node determines a lower-level area identity list of the UE based on the upper-level area identity list.

For the upper-level area identity list and the lower-level area identity list, refer to descriptions of the first-level to the $N^{th}$-level area identity lists in FIG. 1. For example, when the upper-level area identity list is a first-level area identity list, the lower-level area identity list is a second-level area identity list.

Optionally, the control plane node may receive a request message sent by the UE, and allocate the lower-level area identity list to the UE based on the request message, that is, perform step S401 after receiving the request message sent by the UE. For example, the request message may be a location area management information obtaining request, a location area management information update request, a registration request message, an attach request message, or the like. The request message may include identification information of the UE, and the control plane node determines, based on the identification information of the UE, an area identity list that is corresponding to the identification information and that is stored on the control plane node.

In an example, the request sent by the UE to the control plane node may be any one of a non-access stratum (NAS) request message, an attach request, a registration request, or a periodic area update/area update (PAU/AU) request.

In addition, the control plane node may allocate the lower-level area identity list to the UE based on a number of different types of information. In an example, the control plane node may determine, based on current location information of the UE and a received upper-level area identity list of the UE, the lower-level area identity list allocated to the UE.

The lower-level area identity list may include a smaller range than the upper-level area identity list, to be specific, an area corresponding to the lower-level area identity list is included in an area corresponding to the upper-level area identity list.

In an example, FIG. 5 shows an area managed by a control plane node according to an embodiment. As shown in FIG. 5, the UE is currently in an area A1. The control plane node allocates an $(N-1)^{th}$-level area identity list to the UE, and the $(N-1)^{th}$-level area identity list includes areas A1, A2, A3, B1, B2, B3, C1, C2, and C3. When paging the UE, the control plane node needs to page the UE in the areas A1, A2, A3, B1, B2, B3, C1, C2, and C3 at the same time. If the UE is always in the area A1, the control plane node allocates an $N^{th}$-level area identity list to the UE, including the areas A1, A2, B1, B2, C1, and C2. When paging the UE, the control plane node only needs to page the UE in the areas A1, A2, B1, B2, C1, and C2.

For example, the lower-level area identity list may be used by the control plane node to page the UE, so as to allocate different levels of area identity lists to the UE based on a moving status of the UE. A higher-level area identity list may be allocated to UE with a relatively fixed location or a relatively small moving range, so that when the control plane node pages such UE, signaling overheads of paging are reduced. An area identity list corresponding to a relatively large area range is allocated to UE with a relatively large moving range, thereby avoiding signaling overheads caused by repeatedly allocating different levels of area identity lists to the UE.

Further, the control plane node may also allocate the $(N-1)^{th}$-level area identity list to the UE based on a number of different types of information, or allocate an area identity list of any one of the first level to the $(N-1)^{th}$ level to the UE. For example, the control plane node previously allocated a tenth-level area identity list to the UE, and the control plane node may currently allocate a third-level area identity list to the UE.

Optionally, in step S401, the control plane node may further determine, according to a local policy, UE whose location area needs to be updated, and determine an area identity list of the UE currently stored by the control plane node. The lower-level area identity list is allocated to the UE based on the currently stored area identity list of the UE and current location information of the UE. The allocation method is the same as that in the foregoing description, and details are not described herein again in the present application.

In step S402, the control plane node sends the lower-level area identity list to the UE.

In an example, when the lower-level area identity list includes the areas A1, A2, B1, B2, C1, and C2, the lower-level area identity list TAI list sent by the control plane node to the UE is A1A2B1B2C1C2.

In step S403, the UE receives the lower-level area identity list sent by the control plane node.

The UE may store an upper-level area identity list.

In step S404, the UE stores the lower-level area identity list.

For example, when the UE currently stores the first-level area identity list to the $(N-1)^{th}$-level area identity list, the UE receives and stores the $N^{th}$-level area identity list. In this case, the UE stores N area identity lists in total from the first level to the $N^{th}$ level.

Optionally, the foregoing method further includes: determining a periodic location update time value and a reachable time value that are corresponding to the lower-level area identity list, that is, determining the periodic location update time value of the lower-level area identity list, and determining the reachable time value of the lower-level area identity list. For example, when determining the tenth-level area identity list, the control plane node further determines a tenth-level periodic location update time value and a tenth-level reachable time value.

Optionally, different levels of periodic location update time values and reachable time values may be set to fixed values. For example, the control plane node sets that a first-level periodic location update time value corresponding to the first-level area identity list is 30 minutes, a first-level reachable time value corresponding to the first-level area identity list is 31 minutes, a second-level periodic location update time value corresponding to a second-level area identity list is 45 minutes, a second-level reachable time value corresponding to the second-level area identity list is 46 minutes, a third-level periodic location update time value corresponding to a third-level area identity list is 60 minutes, and a third-level reachable time value corresponding to the third-level area identity list is 61 minutes.

When sending the lower-level area identity list to the UE, the control plane node further sends a periodic location update time value corresponding to the lower-level area identity list to the UE.

The control plane node further stores an area identity list (TAI list) allocated to the UE and a reachable time value corresponding to the area identity list.

The periodic location update time value is used to indicate a time period within which the UE sends a request message to the control plane node after the UE enters an idle state, so as to notify the control plane node that the UE is currently reachable. The reachable time value is used to indicate a time period within which the control plane node should receive the request sent by the UE after the UE enters the idle state, so as to determine that the UE is currently reachable. The control plane node further allocates a new area identity list to the UE based on the request message.

Optionally, the UE determines, based on a status of a periodic timer maintained by using a periodic location update time corresponding to a highest level of the area identity list that is stored on the UE and that is corresponding to a current location, to send the request message to the control plane node. For example, the UE stores the first-level to the $N^{th}$-level area identity lists. When the UE enters the idle state, the UE starts N periodic timers. The N periodic timers are maintained respectively based on the first-level to the $N^{th}$-level periodic location update time values. The highest level of the area identity list that is stored on the UE and that is corresponding to the current location of the UE is the $(N-1)^{th}$ level, and the UE sends the request message to the control plane node based on the status of the periodic timer maintained by the $(N-1)^{th}$-level periodic timer.

For example, the UE determines, based on the status of the periodic timer maintained by using the periodic location update time value and the current location of the UE, to send the request message to the control plane node.

When the location of the UE does not move, or a moving range is smaller than a range corresponding to the $N^{th}$-level area identity list, the UE sends the request message to the control plane node after the periodic timer maintained by using the periodic location update time value corresponding to the $N^{th}$-level area identity list expires.

When the UE is outside an area range corresponding to the $N^{th}$-level area identity list and within an area range corresponding to the first-level to the $(N-1)^{th}$-level area identity lists, the UE sends the request message to the control plane node when the periodic timer maintained by using the periodic location update time corresponding to the $(N-1)^{th}$-level area identity list expires.

The request message is used to notify the control plane node that the UE can be connected to a network.

The control plane node may further determine, based on the received request message sent by the UE, to allocate a new area identity list to the UE. For example, the control plane node may determine, based on a level of an area identity list corresponding to a reachability management timer that is going to expire in the control plane node when receiving the request message sent by the UE, the level of the area identity list allocated to the UE.

Optionally, when the UE enters the idle state from a connected state, the control plane node starts N reachability management timers. N is equal to a quantity of levels of an area identity list of the UE stored on the control plane node. The control plane node determines a range in which the control plane node pages the UE or a reachability status of the UE based on statuses of the N reachability management timers.

In an example, the control plane node determines, based on a level of the reachable time value corresponding to the reachability management timer that is going to expire when receiving the request message sent by the UE, the level of the area identity list allocated to the UE. For example, the control plane node separately stores the first-level to the $N^{th}$-level area identity lists of the UE. When the UE enters the idle state, the control plane node starts the N reachability management timers. The N reachability management timers are maintained based on reachable time values corresponding to the first-level to the $N^{th}$-level area identity lists of the UE stored on the control plane node.

When the control plane node receives the request message sent by the UE within a threshold range before or after the reachability management timer maintained by using the $N^{th}$-level reachable time value expires, the control plane node further allocates an $(N+1)^{th}$-level area identity list to the UE based on the request message.

When the control plane node receives the request message sent by the UE within a threshold range before or after the reachability management timer maintained by using an $(N-5)^{th}$-level reachable time value expires, the control plane node further allocates an $(N-4)^{th}$-level area identity list to the UE based on the request message.

In addition, when the control plane node cannot receive the request message sent by the UE within a threshold range before or after expiration of the reachability management timer that is maintained by using the reachable time value corresponding to the highest-level area identity list of the UE stored on the control plane node, the control plane node deletes maintained context information of the UE from the control plane node.

Optionally, when paging the UE after the UE enters the idle state, the control plane node performs determining based on a reachable state of the reachability management timer.

In an example, when the control plane node pages the UE within a threshold range before or after the reachability management timer maintained by using the first-level reachable time value expires, the control plane node performs paging within an area range corresponding to the first-level area identity list. When the control plane node pages the UE outside the threshold range after the reachability management timer maintained by using the first-level reachable time value expires and within a threshold range after the reachability management timer maintained by using the second-level reachable time value expires, the control plane node performs paging within an area range corresponding to the second-level area identity list.

Optionally, an area corresponding to the lower-level area identity list is included in an area corresponding to the upper-level area identity list.

Optionally, the control plane node instructs the UE to store the lower-level area identity list. Alternatively, the control plane node indicates the level of the lower-level area identity list to the UE.

Optionally, the control plane node instructs the UE to store the lower-level area identity list, and the control plane node sends indication information to the UE. The indication information is used to instruct the UE to store the lower-level area identity list, and the indication information is further used to instruct the UE to retain the stored area identity list.

The control plane node indicates the level of the lower-level area identity list to the UE, and the control plane node sends the indication information to the UE, where the indication information is used to indicate the level of the lower-level area identity list.

For example, the UE stores the first-level to the ninth-level area identity lists. When level indication information received by the UE is a fifth-level area identity list, the UE deletes the stored fifth-level to the ninth-level area identity lists, and stores a newly received fifth-level area identity list.

Optionally, the determining, by the control plane node, of the lower-level area identity list of the UE based on the upper-level area identity list includes: determining the lower-level area identity list of the UE based on the upper-level area identity list and at least one of a historical moving track of the UE, a moving mode of the UE, a predicted moving track of the UE, and a current location of the UE.

Optionally, when the UE initiates initial registration or the UE is located in an area outside a registered location area, the control plane node determines an initial-level area identity list of the UE. The control plane node sends the initial-level area identity list to the UE. The area corresponding to the upper-level area identity list is included in an area corresponding to the initial-level area identity list, or the upper-level area identity list is the initial-level area identity list.

Optionally, the control plane node further stores a periodic location update time value of the upper-level area identity list, and the foregoing method further includes: sending, by the control plane node, a periodic location update time value of the lower-level area identity list to the UE. The periodic location update time value of the lower-level area identity list is greater than the periodic location update time value of the upper-level area identity list.

Additionally, the UE may further store the periodic location update time value of the upper-level area identity list, and the foregoing method may further include: receiving, by the UE, the periodic location update time value of the lower-level area identity list.

Figure 6:
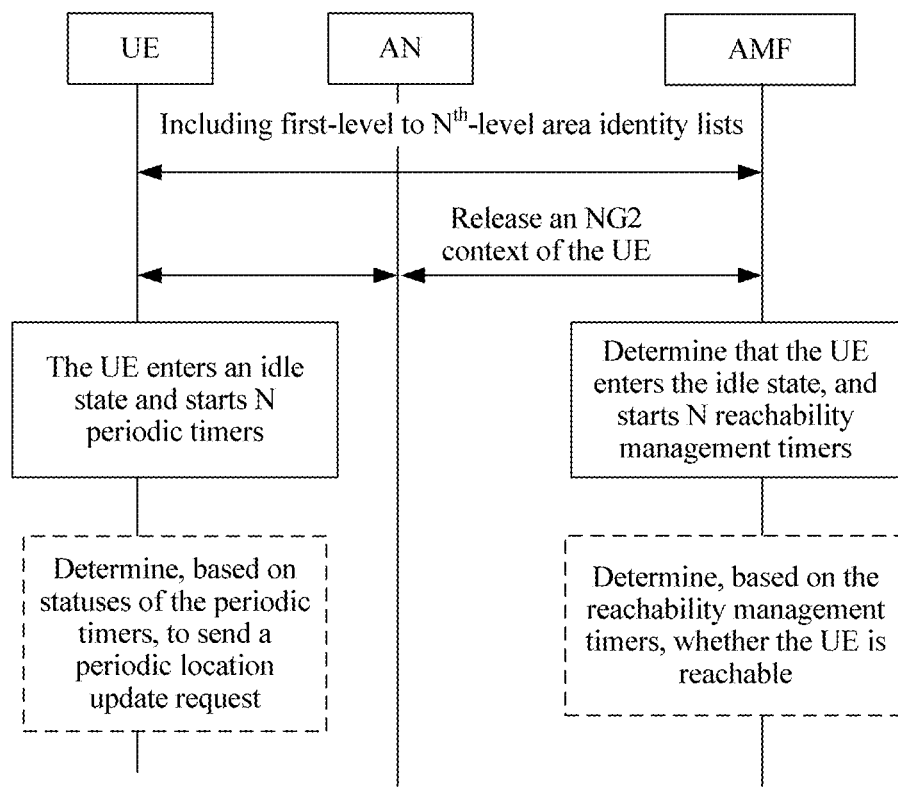
FIG. 6 shows a procedure in which UE enters an idle state according to an embodiment.

The following describes, with respect to FIG. 6, that the UE enters an idle state or the control plane node determines that the UE enters an idle state. FIG. 6 shows a procedure in which UE enters an idle state according to an embodiment. As shown in FIG. 6, UE and an AMF are included, and the AMF is only an example of a control plane node. Information transmission is performed between the UE and the AMF by using an AN node. The UE receives, from the AMF, and stores the first-level to the $N^{th}$-level area identity lists and the first-level to the $N^{th}$-level periodic location update time values corresponding to the area identity lists. The AMF stores the first-level to the $N^{th}$-level area identity lists of the UE and the first-level to the $N^{th}$-level reachable time values corresponding to the area identity lists.

When the UE does not transmit data to a network side for a long time, context release and radio resource control (RRC) connection release are triggered. The context release and the RRC connection release may be triggered by any one of the UE, the AMF, or the AN node when the UE does not transmit data to the network side for a long time.

When the AN node completes an RRC connection release procedure with the UE, the UE enters the idle state. When the AMF determines to release context information of the UE, the AMF determines that the UE enters the idle state.

Figure 7:
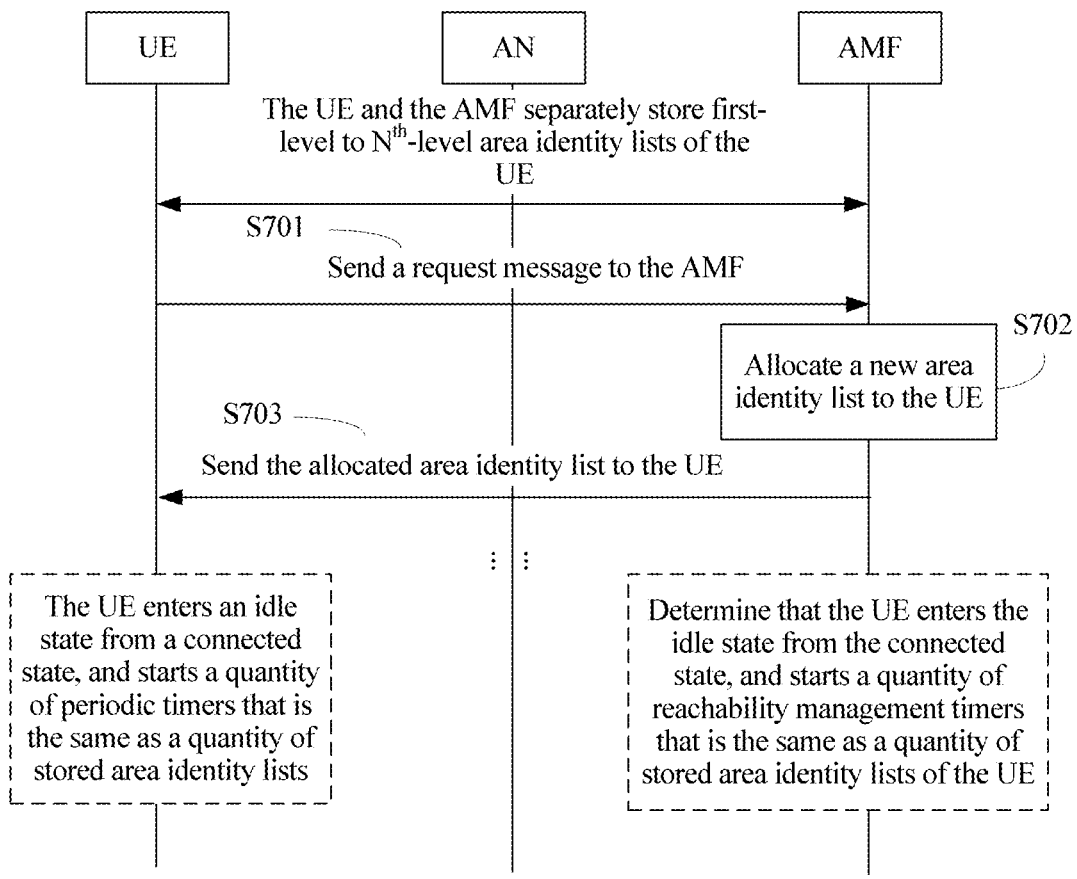
FIG. 7 is a schematic diagram of an area identity list update procedure initiated by UE according to an embodiment.

FIG. 7 is a schematic diagram of an area identity list update procedure initiated by UE according to an embodiment. As shown in FIG. 7, the UE receives, from the AMF, and stores location area management information at N levels from the first level to the $N^{th}$ level. The area identity list TAI list of each level corresponds to one periodic location update time value. In addition, the AMF stores the first-level to the $N^{th}$-level area identity lists correspondingly allocated to the UE and the first-level to the $N^{th}$-level reachable time values corresponding to the area identity lists.

In step S701, the UE sends a request message to an AMF.

For example, when the UE enters an idle state, the UE sends a PAU/AU request to the AMF based on statuses of periodic timers and a location of the UE. For sending, by the UE, the request message to the AMF based on the statuses of the periodic timers, refer to the corresponding description in FIG. 4.

The request message may include identification information of the UE.

In step S702, the AMF allocates a new area identity list to the UE.

For example, after receiving the request of the UE, the AMF may determine, based on the identification information of the UE, that the AMF stores the N-level area identity list of the UE.

Optionally, the control plane node allocates the new area identity list to the UE based on the upper-level area identity list and at least one of a historical moving track of the UE, a moving mode of the UE, a predicted moving track of the UE, and a current location of the UE. The new area identity list may be any level of the area identity list in the first-level to the $(N+1)^{th}$-level area identity list.

In step S703, the AMF sends an allocated area identity list to the UE.

Optionally, when sending the allocated area identity list to the UE, the AMF may further send a periodic location area update time value corresponding to a level of the area identity list to the UE.

Optionally, when sending the allocated area identity list to the UE, the AMF may further send indication information to the UE.

The indication information is used to instruct the UE to store a currently received area identity list, and the indication information is further used to indicate, to the UE, a currently stored area identity list that needs to be retained. Alternatively, the indication information is used to indicate a level of the lower-level area identity list. The UE determines, based on the level of the lower-level area identity list, the currently stored area identity list that needs to be retained.

That the indication information is further used to indicate, to the UE, a currently stored area identity list that needs to be retained may be that the indication information includes a deletion indication. The deletion indication includes a level of an area identity list that needs to be deleted.

For example, the deletion indication is used to instruct the UE to delete allocated $(t+1)^{th}$-level to $N^{th}$-level area identity lists. When receiving a response message, the UE deletes the $(t+1)^{th}$-level to $N^{th}$-level area identity lists. When sending the area identity list to the UE, the AMF further deletes, based on the indication information, a corresponding area identity list of the UE stored on the AMF.

In an example in which the UE determines, based on the level of the lower-level area identity list, the currently stored area identity list that needs to be retained, the indication information may further indicate that the area identity list is the first-level area identity list. When receiving the message, the UE deletes the first-level to the $N^{th}$-level area identity lists, and stores the received area identity list.

When the UE enters the idle state from the connected state, the UE starts a quantity of periodic timers that is the same as a quantity of stored area identity lists. When the UE enters the idle state from the connected state, the AMF starts a quantity of reachability management timers that is the same as a quantity of stored area identity lists of the UE. The UE performs a corresponding operation based on statuses of the periodic timers, and the AMF performs a corresponding operation based on the reachability management timers. A specific operation manner of the UE is the same as a corresponding part in FIG. 4. For the sake of brevity, this is not described in the present application again.

Figure 8:
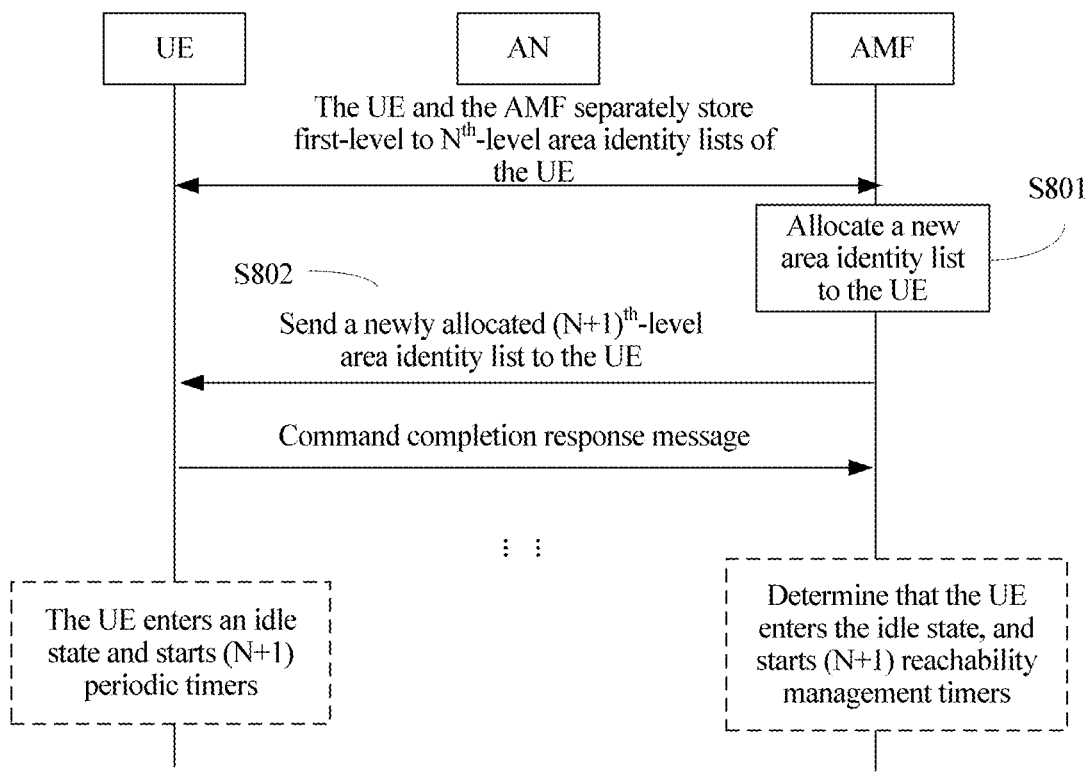
FIG. 8 is a schematic diagram of an area identity list update procedure initiated by an AMF according to an embodiment.

FIG. 8 is a schematic diagram of an area identity list update procedure initiated by an AMF according to an embodiment. As shown in FIG. 8, the UE receives, from the AMF, and stores area identity lists TAI lists of N levels in total from the first level to the $N^{th}$ level and periodic location update time values corresponding to the area identity lists. In addition, the AMF stores the first-level to the $N^{th}$-level area identity lists of the UE and reachable time values corresponding to the area identity lists.

In step S801, an AMF allocates a new area identity list to UE.

The AMF may actively allocate a new area identity list to the UE under specific conditions.

In addition, the AMF may further obtain the upper-level area identity list, an area in which the UE is currently located, and/or at least one of a historical moving track of the UE, a moving mode of the UE, a predicted moving track of the UE, and a current location of the UE. The AMF determines the newly allocated area identity list of the UE based on the upper-level area identity list, the area in which the UE is currently located, and/or at least one of the historical moving track of the UE, the moving mode of the UE, the predicted moving track of the UE, and the current location of the UE. The newly allocated area identity list is an $(N+1)^{th}$-level area identity list.

When the AMF allocates the $(N+1)^{th}$-level area identity list to the UE, the AMF further allocates an $(N+1)^{th}$-level periodic location update time value and an $(N+1)^h$-level reachable time value to the UE.

In step S802, the AMF sends a newly allocated $(N+1)^{th}$-level area identity list to the UE.

After receiving and storing the area identity list, the UE further sends a response message to the AMF. The UE currently includes and stores the first-level to the $(N+1)^{th}$-level area identity lists.

When sending an allocated $(N+1)^{th}$-level area identity list to the UE, the AMF further sends the $(N+1)^{th}$-level area identity list to the UE.

When the UE enters an idle state, the UE starts first-level to $(N+1)^{th}$-level periodic timers. The UE sends a request message to the AMF based on statuses of the periodic timers and a location of the UE. When the UE enters the idle state, the AMF starts first-level to $(N+1)^{th}$-level reachability management timers. The AMF determines a reachability status of the UE based on whether to receive the request sent by the UE. The AMF further determines, based on a level of the reachable time value corresponding to a reachability management timer that is going to expire when receiving the request message sent by the UE, a level of the area identity list allocated to the UE. It should be noted that a method procedure described in FIG. 7 and FIG. 8 may also be applied to an EPS system. When the method procedure is applied to the EPS system, an AN node should be an eNB, the AMF should be an MME, and a PAU message may be a PTAU message. An AU may be a normal TAU. An AI list is a TAI list.

Figure 9A:
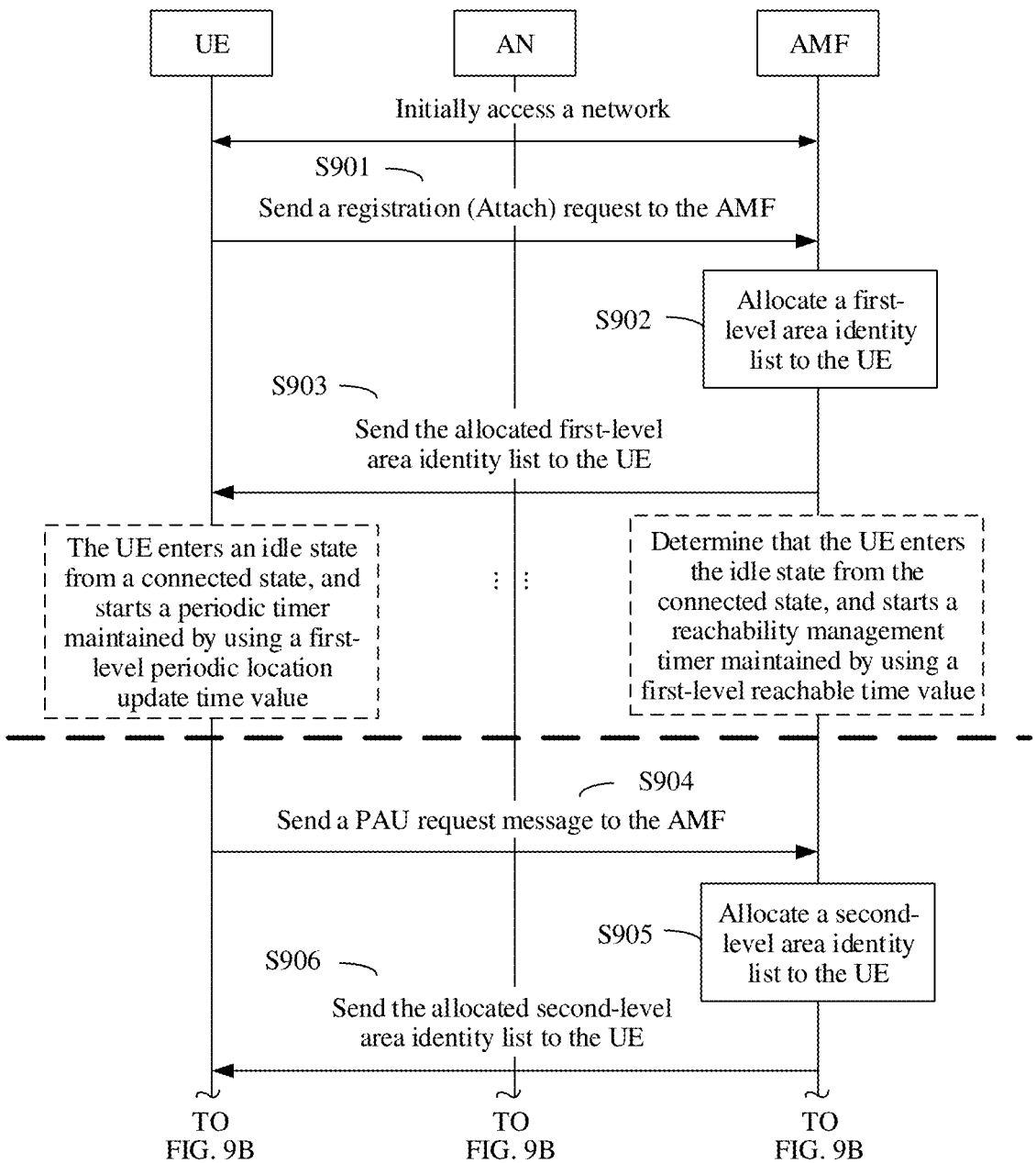
FIG. 9A is a schematic diagram of an area identity list update procedure according to an embodiment.
Figure 9B:
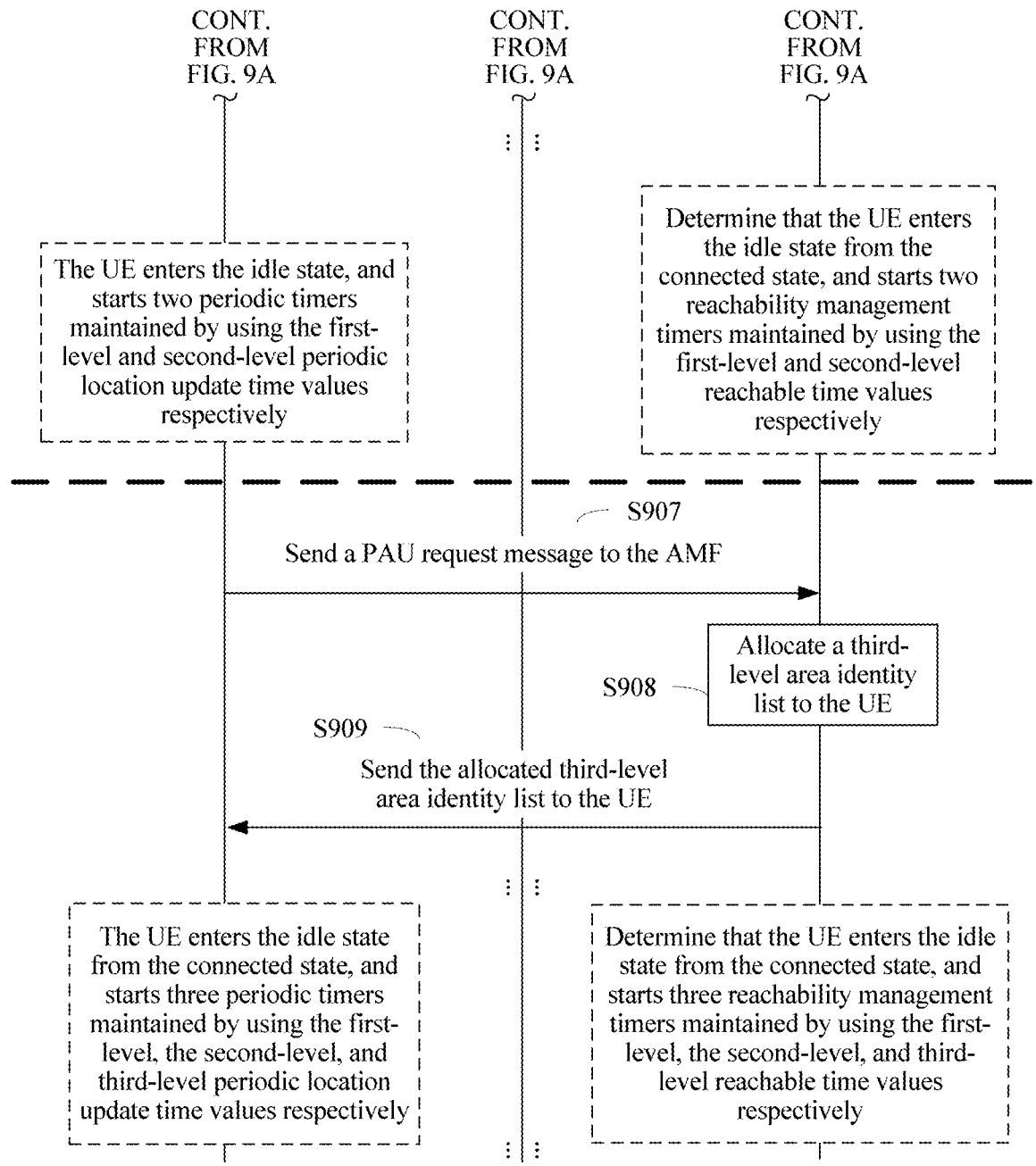
FIG. 9B is a schematic diagram of an area identity list update procedure according to an embodiment.

The following provides a further example to describe in detail a location area management method provided in an embodiment. FIG. 9A and FIG. 9B are a schematic diagrams of an area identity list update procedure according to a specific embodiment of the present application. As shown in FIG. 9A and FIG. 9B, the method is applied between UE and an AMF in a 5G communications system. A message sent between the UE and the AMF is transmitted by using an AN node. Further, the method may also be applied between UE and an MME in an EPS system. A message between the UE and the MME is transmitted by using an eNB.

In step S901, send a registration (Attach) request message to an AMF.

In an example, when the UE initially accesses a network, the AMF allocates an AMF-based area identity list to the UE, so that the current AMF pages the UE. For example, when initially accessing the network, the UE needs to send an attach request to the AMF, where the attach request includes at least identification information of the UE. The AMF performs S901 based on the attach request.

In step S902, the AMF allocates a first-level area identity list to the UE.

After receiving the request sent by the UE, the AMF determines, based on the identification information of the UE, an area identity list included in the AMF. When the AMF determines that the UE initially registers with the network, the AMF allocates a first-level area identity list to the UE.

When the AMF determines to allocate the first-level area identity list to the UE, the AMF further allocates a first-level periodic location update time value and a first-level reachable time value to the UE.

In step S903, the AMF sends an allocated first-level area identity list to the UE.

Optionally, when sending the allocated first-level area identity list to the UE, the AMF further sends a first-level periodic location update time value to the UE.

Optionally, when sending the first-level area identity list to the UE, the AMF further sends indication information to the UE. The indication information is used to instruct the UE to store the first-level area identity list.

Additionally, the UE stores the first-level area identity list and a corresponding periodic location update time value based on the indication information.

When sending the first-level area identity list to the UE, the AMF may further store the first-level area identity list of the UE, and may further store a reachable time value of the first-level area identity list.

In step S904, the UE sends a PAU request message to the AMF.

When the UE enters an idle state from a connected state, the UE creates a first periodic timer based on the first-level area identity list. The UE performs S904 based on a status of the first periodic timer and a current location of the UE. The PAU request is used to notify the AMF that the UE is currently reachable.

When the AMF determines that the UE enters the idle state from the connected state, the AMF creates a first reachability management timer based on the stored first-level area identity list. A status of the first reachability management timer is determined by using a reachable time value corresponding to the first-level area identity list. Before the status of the first reachability management timer is reached, the AMF receives the PAU request message sent by the UE.

In step S905, the AMF allocates a second-level area identity list to the UE.

When receiving the request message sent by the UE within the reachable time value after the UE enters the idle state, the AMF determines that the UE is reachable. When receiving the PAU request message sent by the UE, the AMF further performs S905. When performing S905, the AMF determines a second-level area identity list based on the upper-level area identity list and at least one of a historical moving track of the UE, a moving mode of the UE, a predicted moving track of the UE, and a current location of the UE.

When the AMF allocates the second-level area identity list to the UE, the AMF further allocates a second-level periodic location update time value and a second-level reachable time value to the UE.

In step S906, the AMF sends an allocated second-level area identity list to the UE.

Optionally, the foregoing method further includes: sending, by the AMF, a second-level periodic location update time value to the UE.

Optionally, when sending the second-level area identity list to the UE, the AMF further sends indication information to the UE. The indication information is used to instruct the UE to store the first-level area identity list.

In step S907, the UE sends a PAU request to the AMF.

In an example, when the UE switches from the connected state to the idle state, the UE starts the first periodic timer. The UE performs S907 based on a status of the first periodic timer and the location of the UE. When the AMF determines that the UE switches from the connected state to the idle state, the AMF creates a first reachability management timer based on the stored first-level area identity list of the UE, and creates a second reachability management timer based on the second-level area identity list. A status of the first reachability management timer is determined by using the reachable time value corresponding to the first-level area identity list, and a status of the second reachability management timer is determined by using a reachable time value corresponding to the second-level area identity list. The AMF determines a paging range of the UE and/or a reachability status of the UE based on the status of the first reachability management timer or the status of the second reachability management timer. When the AMF cannot receive, within a reachable time value corresponding to the second-level area identity list, a location area management request sent by the UE, the AMF determines that the UE is unreachable.

In step S908, the AMF allocates a third-level area identity list to the UE.

When the AMF receives the PAU request sent by the UE within a threshold before or after the first reachability management timer expires, the AMF performs S905. When the AMF receives a request message sent by the UE out of a threshold after the first reachability management timer expires and within a threshold after the second reachability management timer expires, the AMF performs S905. The AMF performs S905 to allocate a third-level area identity list to the UE based on the upper-level area identity list and at least one of the PAU requests, a historical moving track of the UE, a moving mode of the UE, a predicted moving track of the UE, and a current location of the UE.

When determining to allocate the third-level area identity list to the UE, the AMF further allocates a third-level periodic location update time value and a third-level reachable time value to the UE.

In an example, when the location of the UE does not change in an area corresponding to second-level location area management information, the AMF allocates the third-level area identity list to the UE. When the UE moves in the area corresponding to the second-level area identity list, and the moving is outside the area corresponding to the second-level area identity list and within an area corresponding to the first-level area identity list, the AMF reallocates the second-level area identity list to the UE. When the UE moves in the area corresponding to the second-level area identity list and a moving range is outside the area corresponding to the first-level area identity list, the AMF reallocates the first-level area identity list to the UE.

In step S909, the AMF sends an allocated third-level area identity list to the UE.

Optionally, when sending the allocated third-level area identity list to the UE, the AMF further sends a third-level periodic location update time value to the UE.

Optionally, when sending the third-level area identity list to the UE, the AMF further sends indication information to the UE. The indication information is used to instruct the UE to continue to store the first-level and the second-level area identity lists while storing the third-level area identity list. A method for allocating area identity lists of the third level and subsequent more levels to the UE is the same as the foregoing method for allocating the first-level or the second-level area identity list to the UE. This is not described in the present application again.

A processing method after the UE enters an idle state is also the same as a method for allocating the second-level area identity list to the UE when the UE includes obtaining the third-level or subsequent more-level area identity list. This is not described in the present application again, for the sake of brevity.

It should be noted that FIG. 9A and FIG. 9B are only a part of an exemplary implementation in an exemplary embodiment, and cannot be used to limit the present application.

Figure 10:
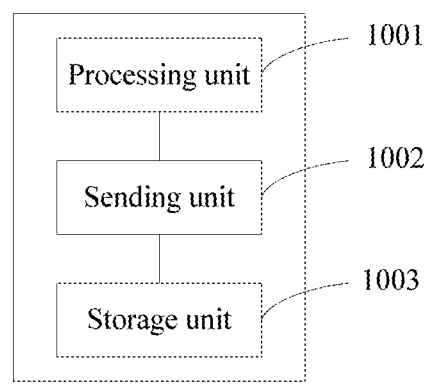
FIG. 10 shows a control plane node according to an embodiment.

FIG. 10 shows a control plane node according to an embodiment. As shown in FIG. 10, the control plane node includes a processing unit 1001, a sending unit 1002, and a storage unit 1003. The control plane node may be an MME or an AMF.

The storage unit 1003 is configured to store an upper-level area identity list of the UE.

The processing unit 1001 is configured to determine a lower-level area identity list of the UE based on the upper-level area identity list.

Optionally, an area corresponding to the lower-level area identity list is included in an area corresponding to the upper-level area identity list.

Optionally, the processing unit 1001 is further configured to determine a periodic location update time value corresponding to the lower-level area identity list.

The periodic location update time value of the lower-level area identity list may be greater than a periodic location update time value of the upper-level area identity list.

Optionally, the determining a lower-level area identity list includes:

determining the lower-level area identity list of the UE based on the upper-level area identity list and at least one of a historical moving track of the UE, a moving mode of the UE, a predicted moving track of the UE, and a current location of the UE.

The sending unit 1002 is configured to send the lower-level area identity list to the UE.

The sending unit 1002 is further configured to send the periodic location update time value of the lower-level area identity list to the UE.

Optionally, the processing unit 1001 is further configured to:

instruct the UE to store the lower-level area identity list; or indicate a level of the lower-level area identity list to the UE.

Further, the processing unit 1003 is configured to send indication information to the UE, where the indication information is used to instruct the UE to store the lower-level area identity list, and the indication information is further used to instruct the UE to retain the stored area identity list.

Further, the processing unit 1003 is configured to send indication information to the UE, where the indication information is used to indicate a level of the lower-level area identity list.

Optionally, when the UE enters an idle state from a connected state, the processing unit 1001 is further configured to start N reachability management timers. N is equal to a quantity of levels of an area identity list of the UE stored on the control plane node. The control plane node determines a paging range of the UE or a reachability status of the UE based on statuses of the N reachability management timers.

Optionally, the processing unit 1001 is further configured to: when the UE initiates initial registration or the UE is located in an area outside a registered location area or the control plane node determines a reallocated lower-level area identity list of the UE, determine an initial-level area identity list of the UE.

Further, the sending unit 1002 is further configured to send the initial-level area identity list to the UE. An area corresponding to the upper-level area identity list may be included in an area corresponding to the initial-level area identity list, or the upper-level area identity list may be the initial-level area identity list.

Optionally, the control plane node further stores a periodic location update time value of the upper-level area identity list.

The sending unit 1002 is further configured to send a periodic location update time value of the lower-level area identity list to the UE. The periodic location update time value of the lower-level area identity list is greater than the periodic location update time value of the upper-level area identity list.

It should be noted that the control plane node in FIG. 10 may be configured to perform actions or steps of applying the AMF or the control plane node in any one of the embodiments shown in FIG. 1 to FIG. 9A and FIG. 9B.

Figure 11:
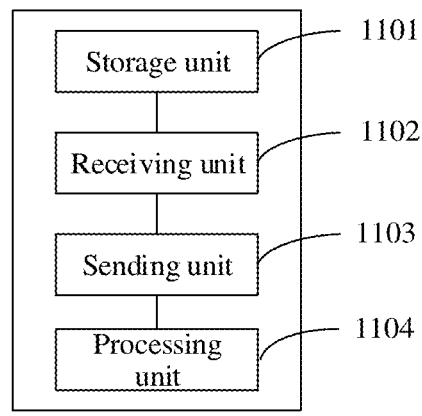
FIG. 11 is a schematic diagram of UE according to an embodiment.

FIG. 11 is a schematic diagram of UE according to an embodiment. As shown in FIG. 11, the UE includes a storage unit 1101, a receiving unit 1102, a sending unit 1103, and a processing unit 1104.

The storage unit 1101 is configured to store an upper-level area identity list of the UE.

The receiving unit 1102 is configured to receive a lower-level area identity list sent by a control plane node.

The control plane node is an MME or an AMF.

The processing unit 1104 is configured to store the lower-level area identity list.

An area corresponding to the lower-level area identity list is included in an area corresponding to the upper-level area identity list.

Optionally, the processing unit 1104 is further configured to: store the lower-level area identity list according to an instruction of the control plane node; or determine a level of the lower-level area identity list according to an instruction of the control plane node.

Further, the receiving unit 1102 is configured to: receive indication information sent by the control plane node, where the indication information is used to instruct the UE to store the lower-level area identity list, and the indication information is further used to instruct the UE to retain the stored area identity list; and store the lower-level area identity list based on the indication information.

Further, the receiving unit 1102 is configured to: receive indication information sent by the control plane node, where the indication information is used to indicate a level of the lower-level area identity list to the UE; and store the level of the lower-level area identity list based on the indication information.

Optionally, the determining the lower-level area identity list of the UE includes:

determining the lower-level area identity list of the UE based on the upper-level area identity list and at least one of a historical moving track of the UE, a moving mode of the UE, a predicted moving track of the UE, and a current location of the UE.

Optionally, when the UE enters an idle state from a connected state, the processing unit 1104 is further configured to start N periodic timers. N is equal to a quantity of levels of an area identity list stored on the UE. The sending unit 1103 is configured to determine, based on statuses of the N timers and a location of the UE, to send a location area management request to the control plane node, where the location area management request is used to notify the control plane node that the UE is in a reachable state.

Optionally, the receiving unit 1102 is configured to receive an initial-level area identity list sent by the control plane node. The processing unit 1104 is configured to store the initial-level area identity list. The area corresponding to the upper-level area identity list is included in an area corresponding to the initial-level area identity list, or the upper-level area identity list is the initial-level area identity list.

Optionally, the UE further stores a periodic location update time value of the upper-level area identity list.

The receiving unit 1102 is further configured to receive a periodic location update time value of the lower-level area identity list.

The periodic location update time value of the lower-level area identity list is greater than the periodic location update time value of the upper-level area identity list.

It should be noted that the UE in FIG. 11 may be configured to perform actions or steps of the UE in any one of the exemplary embodiments shown in FIG. 1 to FIG. 9A and FIG. 9B.

Figure 12:
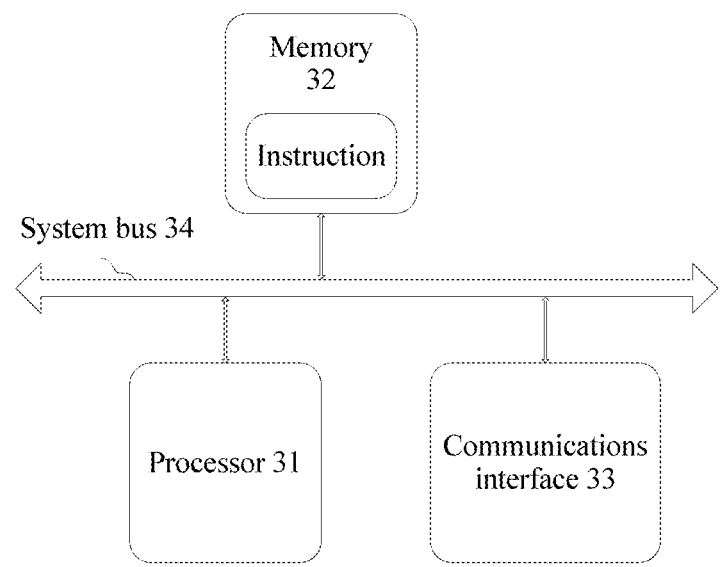
FIG. 12 is a schematic structural diagram of a control plane node according to an embodiment.

FIG. 12 is a schematic structural diagram of a control plane node. The control plane node provided in this embodiment includes a processor 31, a memory 32, a communications interface 33, and a system bus 34.

The memory 32 and the communications interface 33 are connected to the processor 31 and implement mutual communication by using the system bus 34. The memory 32 is configured to store a computer executable instruction. The communications interface 33 is configured to communicate with another device. The processor 31 is configured to run the computer executable instruction, so that the control plane node performs steps of the control plane node or the AMF in the foregoing exemplary embodiments.

Figure 13:
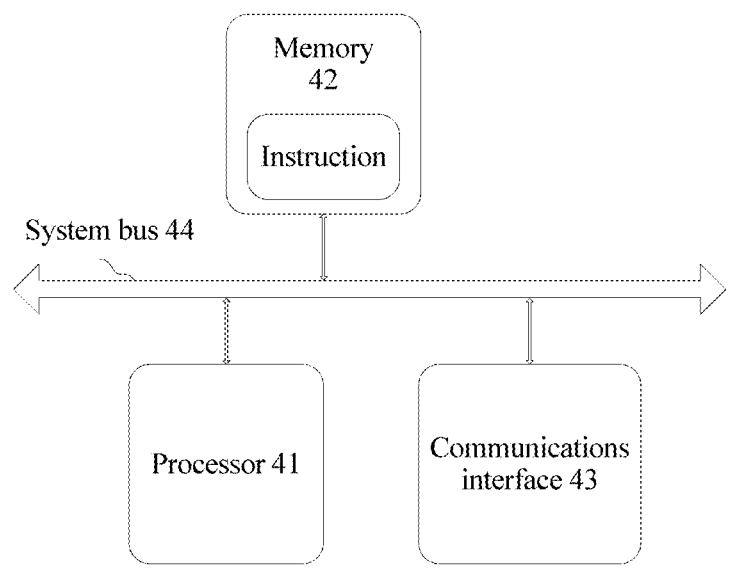
FIG. 13 is a schematic structural diagram of UE according to an embodiment.

FIG. 13 is a schematic structural diagram of UE according to an exemplary embodiment. The UE provided in this embodiment includes a processor 41, a memory 42, a communications interface 43, and a system bus 44.

The memory 42 and the communications interface 43 are connected to the processor 41 and implement mutual communication by using the system bus 44. The memory 42 is configured to store a computer executable instruction. The communications interface 43 is configured to communicate with another device. The processor 41 is configured to run the computer executable instruction, so that the UE performs the steps applied to the UE in the foregoing method embodiments.

A person of ordinary skill in the art may be further aware that, in combination with the examples described in the embodiments, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of the present application.

Steps of methods or algorithms described in the embodiments may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

What is claimed is:

1. A location area management method, the method applied to a communications system, the communications system comprising a control plane node, the control plane node stores an upper-level area identity list of user equipment (UE), the method comprising:
   determining, by the control plane node, a lower-level area identity list of the UE based on the upper-level area identity list;
   sending, by the control plane node, the lower-level area identity list to the UE;
   when the UE enters an idle state from a connected state, starting, by the control plane node, N reachability management timers, wherein N is equal to a quantity of levels of an area identity list of the UE stored on the control plane node; and
   determining, by the control plane node, a paging range of the UE or a reachability status of the UE based on statuses of the N reachability management timers.

2. The method according to claim 1, wherein an area corresponding to the lower-level area identity list is comprised in an area corresponding to the upper-level area identity list.

3. The method according to claim 1, wherein the determining, by the control plane node, of a lower-level area identity list of the UE based on the upper-level area identity list comprises:
   determining, by the control plane node, the lower-level area identity list of the UE based on the upper-level area identity list and at least one of a historical moving track of the UE, a moving mode of the UE, a predicted moving track of the UE, or a current location of the UE.

4. The method according to claim 1, further comprising:
   when the UE initiates initial registration or the UE is located in an area outside a registered location area, determining, by the control plane node, an initial-level area identity list of the UE; and
   sending, by the control plane node, the initial-level area identity list to the UE, wherein
   the area corresponding to the upper-level area identity list is comprised in an area corresponding to the initial-level area identity list, or the upper-level area identity list is the initial-level area identity list.

5. The method according to claim 1, wherein the control plane node further stores a periodic location update time value of the upper-level area identity list, and the method further comprises:
   sending, by the control plane node, a periodic location update time value of the lower-level area identity list to the UE, wherein
   the periodic location update time value of the lower-level area identity list is greater than the periodic location update time value of the upper-level area identity list.

6. A location area management method, the method applied to a communications system, the communications system comprises user equipment (UE), the UE stores an upper-level area identity list of the UE, the method comprising:
   receiving, by the UE, a lower-level area identity list from a control plane node;
   storing, by the UE, the lower-level area identity list;
   when the UE enters an idle state from a connected state, starting, by the UE, N periodic timers, wherein N is equal to a quantity of levels of an area identity list stored on the UE; and
   determining, by the UE based on statuses of the N timers and a location of the UE, to send a location area management request to the control plane node, wherein the location area management request is used to notify the control plane node that the UE is in a reachable state.

7. The method according to claim 6, wherein an area corresponding to the lower-level area identity list is comprised in an area corresponding to the upper-level area identity list.

8. The method according to claim 6, further comprising:
   storing, by the UE, the lower-level area identity list according to an instruction of the control plane node; or determining, by the UE, a level of the lower-level area identity list according to an instruction of the control plane node.

9. The method according to claim 6, further comprising:
receiving, by the UE, an initial-level area identity list from the control plane node; and
storing, by the UE, the initial-level area identity list, wherein
the area corresponding to the upper-level area identity list is comprised in an area corresponding to the initial-level area identity list, or the upper-level area identity list is the initial-level area identity list.

10. The method according to claim 6, wherein the UE further stores a periodic location update time value of the upper-level area identity list, and the method further comprises:
receiving, by the UE, a periodic location update time value of the lower-level area identity list, wherein
the periodic location update time value of the lower-level area identity list is greater than the periodic location update time value of the upper-level area identity list.

11. An apparatus, wherein the apparatus stores an upper-level area identity list of user equipment (UE), and the apparatus comprises at least one processor coupled with a non-transitory storage medium storing executable instructions; wherein the executable instructions, when executed by the at least one processor, cause the at least one processor to:
receive a lower-level area identity list from a control plane node; and
store the lower-level area identity list;
when the UE enters an idle state from a connected state, start N periodic timers, wherein N is equal to a quantity of levels of an area identity list stored on the apparatus; and
determine, based on statuses of the N timers and a location of the UE, to send a location area management request to the control plane node, wherein the location area management request is used to notify the control plane node that the UE is in a reachable state.

12. The apparatus according to claim 11, wherein an area corresponding to the lower-level area identity list is comprised in an area corresponding to the upper-level area identity list.

13. The apparatus according to claim 11, wherein the at least one processor is configured to:
store the lower-level area identity list according to an instruction of the control plane node; or
determine a level of the lower-level area identity list according to an instruction of the control plane node.

14. The apparatus according to claim 13, wherein the at least one processor is further configured to:
receive indication information from the control plane node, wherein the indication information is used to instruct the apparatus to store the lower-level area identity list, and the indication information is further used to instruct the apparatus to retain the stored area identity list; and
store the lower-level area identity list based on the indication information.

15. The apparatus according to claim 13, wherein the at least one processor is further configured to:
receive indication information from the control plane node, wherein the indication information is used to indicate the level of the lower-level area identity list to the apparatus; and
store the level of the lower-level area identity list based on the indication information.

16. The apparatus according to claim 11, wherein the at least one processor is further configured to:
receive an initial-level area identity list from the control plane node; and
store the initial-level area identity list, wherein the area corresponding to the upper-level area identity list is comprised in an area corresponding to the initial-level area identity list, or the upper-level area identity list is the initial-level area identity list.

17. The apparatus according to claim 11, wherein the apparatus further stores a periodic location update time value of the upper-level area identity list, and the at least one processor is further configured to receive a periodic location update time value of the lower-level area identity list, wherein
the periodic location update time value of the lower-level area identity list is greater than the periodic location update time value of the upper-level area identity list.

* * * * *